United States Patent [19]

Herrington, Jr.

[11] Patent Number: 5,078,930
[45] Date of Patent: Jan. 7, 1992

[54] BUBBLE PRESSURE CONTROL FOR WATER BATH COOLING

[75] Inventor: F. John Herrington, Jr., Holcomb, N.Y.

[73] Assignee: Mobil Oil Corporation, Fairfax, Va.

[21] Appl. No.: 560,418

[22] Filed: Jul. 30, 1990

[51] Int. Cl.$^5$ .............................................. B29C 47/92
[52] U.S. Cl. ................................. 264/40.3; 264/562; 264/564; 264/178 R; 425/71; 425/72.1; 425/140; 425/162; 425/326.1
[58] Field of Search ................ 264/403, 402, 558-564, 264/178 R; 425/71, 72.1, 140, 162, 326.1

[56] References Cited

U.S. PATENT DOCUMENTS

| | | | |
|---|---|---|---|
| 2,519,375 | 8/1950 | Jargstorff et al. | 264/558 |
| 2,541,064 | 2/1951 | Irons | 264/562 |
| 2,804,642 | 9/1957 | Milne | 264/562 |
| 3,388,197 | 6/1968 | Samways | 264/562 |
| 4,069,292 | 1/1978 | Herrington et al. | 264/40.3 |
| 4,243,363 | 1/1981 | Mulcahy | 425/140 |
| 4,355,966 | 10/1982 | Sweeney et al. | 425/140 |
| 4,377,540 | 3/1983 | Cluett et al. | 264/23 |
| 4,402,656 | 9/1983 | Schott | 425/140 |
| 4,699,580 | 10/1987 | Co | 425/140 |
| 4,927,574 | 5/1990 | Herrington | 264/40.6 |

FOREIGN PATENT DOCUMENTS 1138324 1/1969 United Kingdom ................ 264/562

Primary Examiner—Jeffery Thurlow
Attorney, Agent, or Firm—Alexander J. McKillop; Charles J. Speciale; Michael J. Mlotkowski

[57] ABSTRACT

A method for continuously controlling the pressure in a bubble formed of a continuously extruded seamless blown thermoplastic film tubing which is being conducted generally upwardly through a cooling water bath. More particularly, the method contemplates controlling the internal bubble pressure through the intermediary of a Photohelic pressure controller which is utilized to monitor the differential prevailing between the internal bubble pressure and that of the water bath encompassing the bubble. The invention also relates to an apparatus for controlling the internal pressure of a bubble constituted from a seamless blown thermoplastic film which is extruded and conducted through an external cooling water bath, employing the method pursuant to the invention.

20 Claims, 1 Drawing Sheet

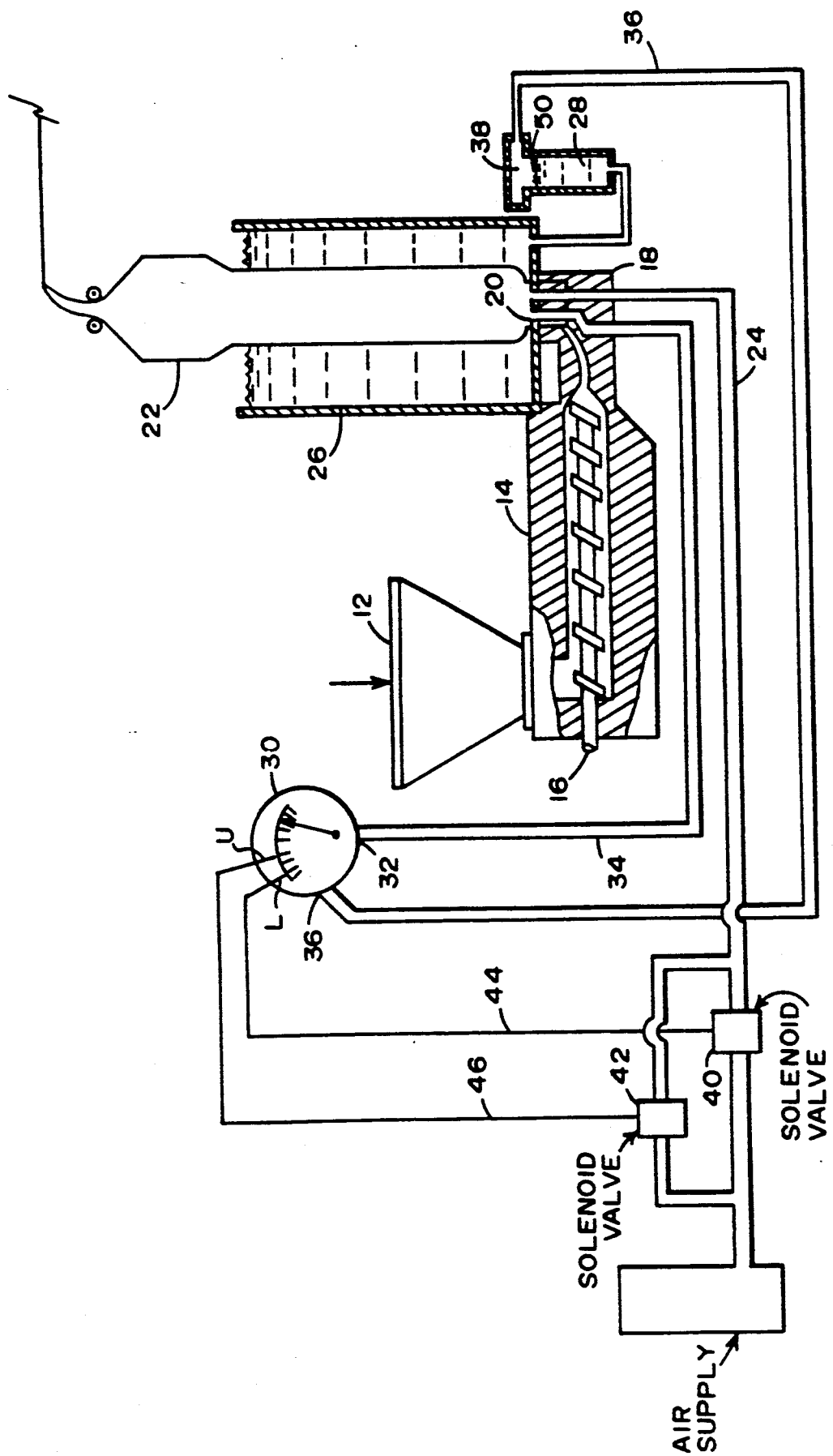

BUBBLE PRESSURE CONTROL FOR WATER BATH COOLING

FIELD OF THE INVENTION

The present invention relates to a method for continuously controlling the pressure in a bubble formed from a continuously extruded seamless blown thermoplastic film tubing which is being conducted generally upwardly through a cooling water bath. More particularly, the method contemplates controlling the internal bubble pressure through the intermediary of a Photohelic pressure controller which is utilized to monitor the differential prevailing between the internal bubble pressure and that of the water bath encompassing the bubble. The invention also relates to an apparatus for controlling the internal pressure of a bubble constituted from a seamless blown thermoplastic film which is extruded and conducted through an external cooling water bath, employing the method pursuant to the invention.

BACKGROUND OF THE INVENTION

In essence, it is well-known in the technology which is concerned with the extrusion of molten thermoplastic tubular film to provide an apparatus and method which will control the internal air pressure in the film bubble upon the extrusion thereof through an annular die orifice, and prior to effectuating the collapsing of the tube between suitable pinch rolls or the like which draw the expanded bubble in a longitudinal or machine direction, which rolls also serves to flatten the formed tube into a double thickness sheeting adapted to be wound into a cylindrical roll for storage and subsequent use.

Basically, the gaseous medium which is employed to inflate the tubular film bubble as the latter is being extruded from an extrusion die orifice is forced into the interior of the tubular film through a suitable inlet in the extrusion die under a generally constant pressure which is adequate to produce a desired radial expansion of the extruded tube, and resultantly a molecular orientation of the successive portions of the tubular film subsequent to exiting from the extrusion die and while being externally cooled to an orientation temperature. Generally, in various physical applications the external cooling of the film bubble may be implemented through impinging cooling air supplied by one or more annular cooling air rings encompassing the tube or pursuant to an alternative arrangement, as in the present instance, by passing the inflated film tube or bubble upwardly through a surrounding water bath cooling apparatus which produces the rapid quenching of the extruded tubular thermoplastic film which is in a molten state so as to enhance the speed of cooling thereof and increase the strength of the film material.

Thus, for instance, a water bath film cooling apparatus and method which may be readily employed in connection with the present invention for controlling the bubble pressure is disclosed in applicant's U.S. Pat. No. 4,927,574, which is commonly assigned to the assignee of the present application, and the disclosure of which is incorporated herein by reference. In that disclosure, a water column communicating with and conforming to the vertical height of a cooling water bath surrounding the film tube is employed to assert in maintaining a predetermined optimized pressure differential between the outside of the film tube or bubble being extruded over the height of the liquid cooling medium or water bath and the interior of the film tube so as to provide for an improved cooling operation and enabling control over the size o diameter of the film bubble.

In accordance with the disclosure of Herrington, et al. U.S. Pat. No. 4,069,292, also assigned to the common assignee of the present application, and the disclosure of which is incorporated herein by reference, control is exercised over the pressure which reigns internally of a molten tubular film being extruded from an extrusion apparatus to form a film bubble, in that a Photohelic pressure controller may be employed to continually measure the internal pressure of the thermoplastic tube which is being extruded, and if the pressure deviates beyond a range set by upper and lower set points on the controller, to either slowly or rapidly introduce or withdraw air from the interior of the film bubble being extruded so as to exercise a regulating effect over the dimensions or diameter of the bubble. In this patent, the cooling of the outside surface of the film bubble is effectuated through the intermediary of impinging an air flow against the surface by positioning an air ring downstream of the extrusion die orifice.

However, during an upward extrusion of a tubular film which is being conducted through a cooling water bath rather than being cooled by a flow of air, the internal pressure of the film bubble must be controlled to some specified amount which is greater than the external pressure exerted at the extrusion die by the head of water from the water bath. Thus, as the depth of the water is increased during the thread-up of the system, the controlled bubble pressure must increase correspondingly so as to always remain higher by the same differential amount than that of the water depth presented by the cooling water bath. Consequently, during thread-up, the bubble pressure prevailing within the tubular film must increase from, for instance, from 4" to 124", while the depth of the water bath rises from 0 to 120". In this connection, it is extremely difficult to maintain this difference by a direct control of bubble pressure, inasmuch as the set point of the employed pressure controller must be continually readjusted to conform with the changing conditions encountered during this time period.

Although various methods and apparatus have been employed in the thermoplastic tubular film extrusion technology to control film bubble pressure, none of these are in essence applicable to utilization of controlling bubble pressure, particularly during the thread-up of the extruding system, in which the tubular film is conducted upwardly through a cooling water bath imparting an external pressure against the surface of the tubular film bubble over a varying height.

U.S. Pat. No. 4,069,292, a co-inventor of which is the inventor of the present invention, primarily employs a Photohelic pressure controller in conjunction with regulating the internal pressure of a film bubble, and in which the external cooling is effected through the intermediary of an air flow impinging against the outer surface of the film bubble. Consequently, the structure and function of the Photohelic pressure controller disclosed in this particular patent, and which acts only with gaseous media, such as air, is not adapted for use with an extrusion system for tubular films employing a cooling water bath, and particularly in attempting to control the internal bubble pressure during the thread-up of the system.

Co, U.S. Pat. No. 4,699,580, discloses a system for controlling the diameter of a blown film tube. However, there is no disclosure of methods or apparatus for controlling the pressure differential between the interior of a film tube and an external cooling water bath surrounding the tube analogous to that contemplated by the present invention.

Cluett, et al., U.S. Pat. No. 4,377,540, disclose a system for controlling the diameter of an extruded film tube or bubble which is cooled internally, and which incorporates electronic sensor devices for regulating the flow of air. This disclosure does not teach controlling the pressure prevailing within an extruded tubular film in conformance with the external pressure of a cooling water bath through which the tube is conducted upwardly.

Mulcahy, U.S. Pat. No. 4,243,363, discloses a physical sensing system for contacting an extruded film tube so as to regulate the size thereof by varying the internal pressure. Again, there is no correlation with that particular patent and the present invention since the patent does not disclose a water bath surrounding the film tube.

Schott, Jr., U.S. Pat. No. 4,402,656, discloses a system for measuring the diameter of an extruded film tube and upon deviation in the size thereof, through photo-optical sensing devices enabling controlling the size of the film tube by regulating an internal airflow.

Finally, Sweeney, et al., U.S. Pat. No. 4,355,966, disclose the automatic control of film bubble size for a blown tubular film by measuring the diameter thereof and, by means of an electronic system, adjusting the air flow being supplied to the interior of the tube which is being extruded.

SUMMARY OF THE INVENTION

In contrast with the foregoing methods and apparatus, the present invention contemplates the provision of a method and apparatus for controlling the bubble pressure prevailing within an extruded tubular thermoplastic film which is being conducted upwardly through a cooling water bath, and in which a Photohelic pressure controller is employed to control the differential between the internal bubble pressure and the surrounding water pressure of the cooling water bath. In this connection, an air-over-water chamber is employed to convey the value of the water pressure of the water bath to the Photohelic pressure controller, but to isolate the water from the Photohelic pressure controller inasmuch as the latter is inoperative with water or similar liquids and is only capable of operating with a gaseous medium, such as air, whereby the water must be prevented from being directly applied to the Photohelic pressure controller.

In essence, the Photohelic pressure controller, which is an instrument measuring low differential gas pressures and activates a double-poled, double-throw switch when either of two set points in the instrument has been reached, has the internal bubble pressure applied to a high pressure side of the Photohelic pressure controller, and in which the pressure exerted by the water bath on an enclosed gaseous medium, such as air, is applied to a low pressure side of the Photohelic pressure controller so as to produce a read-out of a pressure differential, and whereby the controller acts to maintain the internal bubble pressure by responding to the set points of the controller. Thus, for instance, upon the differential pressure between the internal pressure within the film bubble and the external pressure exerted by the water bath deviating beyond the set points, the Photohelic pressure controller responds to maintain the bubble pressure by controlling the differential pressure through either slowly or rapidly increasing flow of air to the interior of the bubble.

Therefore, according to the present invention, there is provided a method for controlling an internal air pressure in a tubular thermoplastic film bubble formed by continually extruding a seamless tube of molten film material, comprising the steps of: applying a water bath cooling medium to the external surface of the film bubble downstream of the extruding thereof so as to quench the molten tubular film material; maintaining air pressure within the film bubble during passage thereof through the water bath cooling medium; measuring the pressure of a gaseous medium representative of a column of water commensurate with the pressure of the water bath acting on the film bubble; and controlling the differential in the pressures of the air in the film bubble and that of the gaseous medium so as to control the pressure of air in the film bubble in conformance with variations in the height of the water bath.

Also provided is an apparatus for controlling an internal air pressure in a tubular thermoplastic film bubble, comprising: means for continually extruding and conducting a seamless tube of molten film material to form the film bubble; quenching means including a cooling water bath applied to the external surface of the film bubble downstream of the extruding means; and means for measuring the air pressure present in the film bubble and the pressure of a gaseous medium representative of the pressure exerted by the water bath against the film bubble, the measuring means including control means for regulating the flow of air into the film bubble in response to deviation from a specified value in the pressure differential between the pressure of the air in the film bubble and that of the gaseous medium.

Accordingly, it is an object of the present invention to provide an apparatus for controlling the internal pressure of a film bubble being extruded upwardly into a surrounding cooling water bath.

A more specific aspect of the present invention resides in the provision of a novel method for maintaining a predetermined pressure differential between the interior of a film bubble being extruded and the exterior pressure exerted thereon by a cooling water bath.

Yet another object of the present invention is to provide a method of the type described herein in which a Photohelic pressure controller is employed to maintain a predetermined pressure differential between the interior of a film bubble and the pressure exerted against the exterior surface of the bubble by a cooling water bath.

Still another object of the present invention is the provision of an apparatus for maintaining a predetermined pressure differential between the internal pressure prevailing in an extruded tubular film forming a film bubble, and an external pressure exerted by a surrounding cooling water bath, and to thereby regulate the inflow of air to the bubble in response to sensed deviations from preset pressure differentials in a Photohelic pressure controller.

Other objects and the several advantages will become apparent to those skilled in the art upon a reading of the specification and the claims appended thereto.

BRIEF DESCRIPTION OF THE DRAWINGS

Reference may now be had to the following detailed description of a preferred embodiment of an apparatus for controlling the pressure in a film bubble of an extruded thermoplastic material being conducted upwardly through a cooling water bath in correlation with the pressure exerted thereon by the latter, taken in conjunction with the accompanying single drawing showing a bubble pressure control system incorporating a Photohelic pressure controller operatively interconnected between a tubular film extrusion apparatus and a cooling water bath encompassing the extruded tubular film.

DETAILED DESCRIPTION OF THE INVENTION

Referring now in more specific detail to the drawing, there is schematically illustrated an apparatus for the continuous extrusion of a tubular thermoplastic film, as is generally well-known in the extrusion technology.

In essence, thermoplastic resin may be fed into a suitable feed hopper 12 communicating with a screw type extruder 14 in which the resin is melted, and then advanced through the intermediary of a screw 16 towards an annular extrusion die 18 possessing a die orifice 20 through which the molten thermoplastic material is extruded in the shape of a seamless molten tube or film bubble 22.

As the tube 22 is extruded upwardly, a flow of a pressurized gaseous medium, such as air, is conveyed into the interior thereof through a suitable infeed conduit 24 extending through the annular extrusion die 18 so as to inflate the film bubble 22 as it is being advanced upwardly upon extrusion.

During the upward advance of the inflated film bubble 22, the latter is encompassed downstream of the die 18 by a suitable water bath 26 of specified height, and wherein the water may be heated or temperature controlled as is disclosed in applicant's U.S. Pat. No. 4,927,574, the disclosure of which is incorporated herein by reference. As shown therein, a water column 28 may be operatively interconnected with the water bath 26 and the extrusion die 18 through suitable conduits entrapping air above the water column so as to provide regulation of the differential which prevails between the pressure or static head of the water bath and the air being introduced into the film bubble 22, in order to regulate and maintain the size of the latter within specified bounds as it is being upwardly conducted through the cooling water bath 26.

In order to maintain a predetermined pressure differential between the pressure of the air or gaseous medium introduced into the bubble 22 during the extrusion thereof, and the external pressure exerted against the bubble by the water bath 26 surrounding the film bubble, a Photohelic pressure controller 30 has a high pressure side 32 thereof connected through a suitable conduit 34 with the interior of the air bubble 22 at the extrusion die 18, thereby providing information over the pressure existent within the film bubble 22. A low pressure side 36 of the Photohelic pressure controller 30 may then be connected through a conduit 36 with an enclosed air space or chamber 38 above water column 28 in which the pressure in chamber 38 is indicative of the static pressure head or water pressure of the water bath 26. Such a Photohelic pressure controller is manufactured by and available from Dyer Instrument, Inc.

Thus, upon the pressure differential between the high and low pressure sides of the controller 30 deviating from the range between set points specifying lower and upper pressure differential limits in the Photohelic pressure controller 30, suitable valving 40 and 42 may be activated, such as through the intermediary of a double-poled, double-throw switch of the controller at the reaching of the pressure differential of either of the two set points in the instrument, such that the Photohelic pressure controller 30 acts to maintain the internal bubble pressure by responding to the set points.

Thus, for example, if it is desired to regulate the differential in the pressure between the air inside of the film bubble 22 and that of the cooling water bath 26 acting on the exterior thereof to 4" of water, the upper set point or limit, U, of the Photohelic pressure controller 30 is set to 4" such that, when the pressure differential falls below this set point, solenoid valve 40 is opened by an electrical signal sent through conductor 44 to slowly add air to the interior of the film bubble 22. The lower limit or set point, L, of the Photohelic pressure controller may be set to a value somewhat below 4", possible 3.5", and if the differential pressure falls below that value, the controller 30 sends an electrical signal through conductor 46 to open solenoid valve 42, adding air in a more rapid manner to the interior of the film bubble 22 to thereby compensate for the water pressure acting on the exterior thereof and to maintain the diameter of the film bubble.

As can be appreciated by those skilled in the art, under certain conditions of operation it may be desirable to bleed off air from the film bubble in order to reduce the pressure residing therein. Although air leakage at the nips is usually of a magnitude sufficient to eliminate the need to provide a separate bleed line for control by Photohelic pressure controller 30, one nevertheless may be provided. In such a case, the lower pressure differential limit set point, L, of the Photohelic pressure controller 30, may be set to a value on the order of about 0.5". If the differential pressure rises above that value, controller 30 sends an electrical signal through a conductor (not shown) to open a solenoid valve (also not shown), plumbed to permit the bleeding of air from the interior of film bubble 22. Alternatively, a separate bleed line having a bleed control orifice can be provided, such an arrangement not requiring control by Photohelic pressure controller 30.

It may also be desirable to provide a larger pressure control range than that described above; for example, a range on the order of about 25" of water column. While a Photohelic pressure controller can be purchased having a control range of this magnitude, greater control precision can be achieved by merely lowering water column 28 relative to die orifice 20 so that liquid level 50 of water column 28 will be located a set distance below die orifice 20, that distance corresponding to the increase in range to be achieved. In this manner, it is possible to utilize the more precise Photohelic pressure controller described above.

Although not shown in the drawing appended hereto, a liquid trap can be incorporated in line 36 so as to protect Photohelic controller 30 in the event that liquid fills air space 38 and exits water column 28 through conduit 36. It is to be understood that such a modification to the embodiment depicted in the drawing is within the scope of the present invention.

The inventive bubble control system employing a Photohelic pressure controller 30 is particularly well suited to function with a water bath film cooling apparatus as disclosed in applicant's U.S. Pat. No. 4,927,574 inasmuch as that particular system for extruding tubular film necessitates the utilization of a large amount of water in the parallel tank. Consequently, inasmuch as the water is heated, and since it must be drained every time the extrusion line is re-threaded, extremely large storage is required for water and an excess amount of time is necessary for changing the temperature of that water. It is not possible to employ a small tube for the parallel tank or water column since the air will not bubble upwardly in small bubbles if the tank is small but instead will exhaust in big globs, creating an unsteady pressure. The present invention clearly obviates this particular limitation by providing a Photohelic pressure controller adapted to handle liquid pressure acting on a extruded film tube or bubble, without the Photohelic pressure controller having to come into contact with such liquid which would effectively render the device inoperative. Moreover, the system in applicant's U.S. Pat. No. 4,069,292 is primarily adapted for effectuating a direct control over bubble pressure, in which the external cooling is only supplied by an airflow from an air ring, and consequently does not relate to a system for the control and maintenance of differential pressure; namely, that of between the pressure prevailing within the film bubble 22 and the external pressure exerted thereon by a cooling water bath 26.

While there has been shown and described what is considered to be a preferred embodiment of the invention, it will, of course, be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A method for controlling an internal air pressure in a tubular thermoplastic film bubble formed by continually extruding a seamless tube of molten film material through an extrusion die orifice, comprising:
   (a) applying a water bath cooling medium to the external surface of said film bubble downstream of the extruding thereof so as to quench said molten tubular film material;
   (b) maintaining air pressure within said film bubble during passage thereof through said water bath cooling medium;
   (c) measuring the pressure of a gaseous medium representative of a column of water commensurate with the pressure of said water bath acting on said film bubble; and
   (d) controlling the differential in the pressures of the air in said film bubble and that of the gaseous medium so as to control the pressure of air in said film bubble in conformance with variations, in the height of said water bath.

2. The method of claim 1, further comprising the step of measuring the pressure of air within said film bubble.

3. The method of claim 2, wherein said differential between the air pressure in said film bubble and said gaseous medium being acted upon by the pressure of said water column is maintained within predetermined set pressure limits.

4. The method of claim 1, wherein said differential between the air pressure in said film bubble and said gaseous medium being acted upon by the pressure of said water column is maintained within predetermined set pressure limits.

5. The method of claim 4, wherein said pressure differential is maintained by respectively regulating the flow of air into said film bubble responsive to the value of said differential in the pressures between said air and gaseous medium deviating from specified set values.

6. The method of claim 1, wherein said pressure differential is maintained by respectively regulating the flow of air into said film bubble responsive to the value of said differential in the pressures between said air and gaseous medium deviating from specified set values.

7. The method of claim 5, wherein said differential in the pressures of the air in said film bubble and said gaseous medium is controlled by a Photohelic pressure controller.

8. The method of claim 1, wherein said differential in the pressures of the air in said film bubble and said gaseous medium is controlled by a Photohelic pressure controller.

9. The method of claim 7, wherein said gaseous medium comprises air.

10. The method of claim 1, wherein said gaseous medium comprises air.

11. An apparatus for controlling an internal air pressure in a tubular thermoplastic film bubble, comprising:
   (a) means for continually extruding through an extrusion die orifice and conducting a seamless tube of molten film/material to form the film bubble;
   (b) quenching means including a cooling water bath applied to the external surface of the film bubble downstream of said extruding means; and
   (c) means for measuring the air pressure present in the film bubble and the pressure of a gaseous medium representative of the pressure exerted by said water bath against the film bubble, said measuring means including control means for regulating the flow of air into the film bubble in response to deviation from a specified value in the pressure differential between the pressure of said air in the film bubble and that of said gaseous medium.

12. The apparatus of claim 11, wherein said control means comprises a Photohelic pressure controller connected to respectively said air in said film bubble and to said gaseous medium for measuring and controlling the pressure differential therebetween.

13. The apparatus of claim 12, wherein said pressure differential has a value limited between two set points in said controller; and switch means in said controller responsive to said pressure differential deviating from said value actuating valves for regulating the flow of air into said film bubble.

14. The apparatus of claim 11, wherein said pressure differential has a value limited between two set points in said controller; and switch means in said controller responsive to said pressure differential deviating from said value actuating valves for regulating the flow of air into said film bubble.

15. The apparatus of claim 14, wherein a chamber for said gaseous medium communicates with said water bath such that the pressure of said water bath acting on said gaseous medium is representative of the pressure of the water bath exerted against the outside of said gas bubble.

16. The apparatus of claim 11, wherein a chamber for said gaseous medium communicates with said water bath such that the pressure of said water bath acting on said gaseous medium is representative of the pressure of the water bath exerted against the outside of said gas bubble.

17. The apparatus of claim 15, wherein said gaseous medium comprises air.

18. The apparatus of claim 11, wherein said gaseous medium comprises air.

19. The method of claim 1, wherein the column of water has a liquid level located a distance below the extrusion die orifice.

20. The apparatus of claim 16, wherein said chamber is located above a water column having a liquid level located a distance below the extrusion die orifice.

* * * * *